(12) United States Patent
Fulcer et al.

(10) Patent No.: US 8,796,586 B2
(45) Date of Patent: Aug. 5, 2014

(54) PORTABLE WELDING/CUTTING DEVICE

(75) Inventors: Jack Fulcer, Greenville, WI (US); Mike Vanden Heuvel, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2004 days.

(21) Appl. No.: 11/633,269

(22) Filed: Dec. 4, 2006

(65) Prior Publication Data
US 2008/0078753 A1    Apr. 3, 2008

Related U.S. Application Data

(60) Provisional application No. 60/848,101, filed on Sep. 29, 2006.

(51) Int. Cl.
*B23K 9/10* (2006.01)

(52) U.S. Cl.
USPC .......................... 219/132; 219/136; 219/137.7

(58) Field of Classification Search
USPC .............. 219/136, 130.1, 130.31, 132, 137.7, 219/137.71; 190/18
See application file for complete search history.

(56) References Cited

U.S. PATENT DOCUMENTS

| | | | | |
|---|---|---|---|---|
| 5,837,968 A * | 11/1998 | Rohrberg et al. | .......... | 219/130.1 |
| 6,479,795 B1 * | 11/2002 | Albrecht et al. | .......... | 219/137.2 |
| 6,596,972 B1 * | 7/2003 | Di Novo et al. | .......... | 219/137.9 |
| 6,769,588 B2 * | 8/2004 | Zheng | .......... | 224/576 |
| 6,776,271 B2 * | 8/2004 | Chen | .......... | 190/18 A |
| 6,857,512 B2 * | 2/2005 | Scicluna et al. | .......... | 190/115 |
| 6,899,346 B2 * | 5/2005 | Pfeiffer | .......... | 280/47.29 |
| 6,923,352 B2 * | 8/2005 | Oh | .......... | 224/153 |
| 7,411,153 B2 * | 8/2008 | Radtke | .......... | 219/130.1 |
| 2008/0149611 A1 * | 6/2008 | Roth et al. | .......... | 219/137.7 |
| 2008/0156783 A1 * | 7/2008 | Vanden Heuvel et al. | . | 219/137.2 |

OTHER PUBLICATIONS

Maxstar 150 STH; website—http://www.millerwelds.com/products/tig/maxstar_150_sth/; Miller Electric Co.; 2 pages.
Maxstar 150 STH; TIG/Stick Welding Power Source; Issued Jul. 2004; Index No. DC/27.2; Miller Electric Co.; 2 pages.
Maxstar 150 STL; website—http://www.millerwelds.com/products/tig/maxstar_150_stl/; Miller Electric Co.; 2 pages.
Maxstar 150 STL; TIG/Stick Welding Power Source; Issued Jul. 2004; Index No. DC/27.1; Miller Electric Co.; 2 pages.
Remote Controls; Foot, Hand and Figertip Remote Controls; Miller Electric Co.; 2 pages.

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A portable welding system is disclosed that may be used for TIG and stick welding processes. The welding system comprises a soft-pack carrying case for transporting a number of welding elements. The carrying case includes deflectable walls that form an interior cavity configured to contain the welding elements for transport. The carrying case further includes a set of wheels, a retractable handle, and a fixed handle. The user may either roll the case via the wheels and retractable handle or lift the system via the fixed handles. Finally, the carrying case includes means to seal the interior cavity of the case to further contain the welding elements during transport or long durations of inactivity.

20 Claims, 5 Drawing Sheets

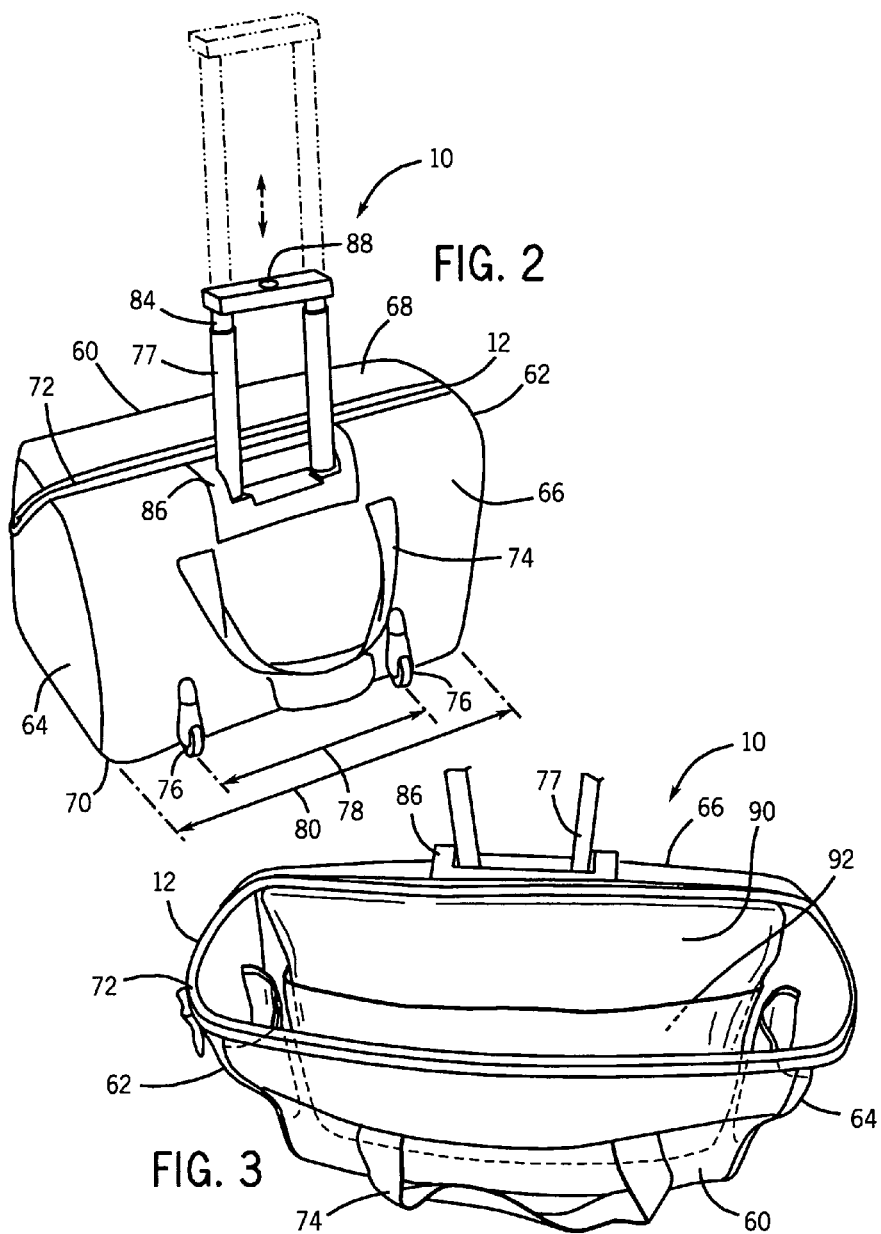

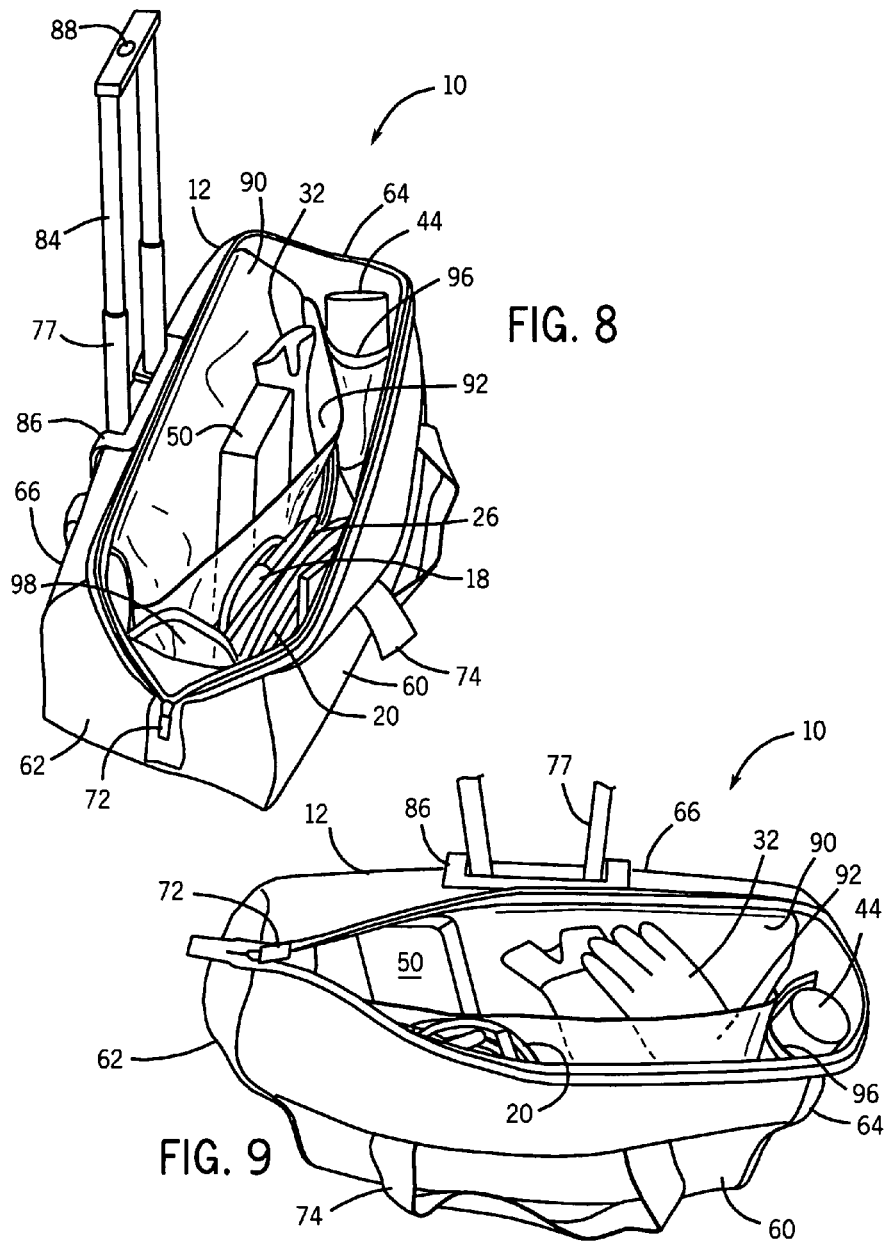

PORTABLE WELDING/CUTTING DEVICE

REFERENCE TO RELATED APPLICATION

This application claims priority to U.S. Provisional Application No. 60/848,101, filed on Sep. 29, 2006.

BACKGROUND

The invention relates generally to the field of Gas Tungsten Arc Welding (TIG) and Shielded Metal Arc Welding (SMAW) or Stick welding. More specifically, the invention relates to a portable light application welding system or kit that incorporates a welding power supply and related gear in a convenient portable case.

Portable welding systems are often used in field applications where it is not practical or convenient to send a work piece to a welding shop for repair or fabrication. One specific group of portable welders are designed for light welding applications (low output requirements of about 200 amps or less), and are well suited for shops and garages where only single-phase power is available. These welders find applications in the farming and ranching industry; food and beverage industry; restaurant and kitchen repair; petroleum and chemical fabrication; shipboard installation and repair; and many other maintenance and repair applications. Furthermore, these welders are relatively light weight (15 to 30 pounds) and have the flexibility of using either 115 volt AC or 230 volt AC single-phase primary power. It is because of the portability and flexibility of these welding systems that they have found wide spread use and popularity.

One serious issue with the portable welders, however, is the number of elements and individual parts that are required to perform the welding operation. These elements must be stored and transported from job site to job site in order to perform the welding operation. A typical portable welder might include a power source, a TIG torch, and an electrode cable, for example. The welders may be equipped with a handle, or may themselves be placed in a relatively large case. However, no accommodation is typically made for other tools and components that may be needed. These are often packed and carried separately. It can be a laborious task to transport all of these items in between applications. Furthermore, loading and unloading all of these items from one location to another is time consuming and inefficient. Finally, in some instances, such portable welders often see only intermittent application and may not be used for relatively long durations of time. In these instances, it is desirable to protect the welding kit from exposure and degradation, and also to contain the individual elements in one location to prevent them from being misplaced.

Some portable welding cases have been developed that can receive a small welder and certain supplies. These are typically made of a hard plastic material or metal, with interior cavities or recesses dedicated to specific components, such as cables, torches, and so forth. However, such cases can be quite cumbersome, and are not easily transported or stored, such as in a vehicle cab or trunk. Also, the dedicated recesses tend to be constraining and, while useful for certain articles, actually limit the elements that a welder can pack in the case. Finally, such cases are not provided with rollers that could facilitate transport of the equipment.

There is a need, therefore, for a portable welding system that is easily transportable. In particular, the device should allow the operator to quickly and easily organize all of the elements of the welding system into a portable unit or transport case.

BRIEF DESCRIPTION

The present invention offers a novel approach that addresses some or all of the issues and problems discussed above. The approach is based upon facilitating the manner in which portable welding systems, welding peripherals and similar equipment are transported. In accordance with one aspect of the invention, a welding or cutting apparatus includes wheels and an extensible handle that permits the user to roll the apparatus from place to place. The wheels will typically be placed at the bottom of the apparatus at or adjacent to one side. The handle can be extended to roll the apparatus. The handle and wheels may conveniently permit the apparatus to be leaned back over the wheels to distribute the load and aid on transport. The approach may be used with a range of apparatus, including welding power supplies, wire feeders, cutting power supplies (e.g., for plasma cutting), as well as cases in which such equipment is stowed.

In one particular implementation, the invention includes a welding kit comprising of a soft-pack carrying case for transporting a number of elements configured to be used for a welding operation. The carrying case includes deflectable walls that facilitate the positioning of the welding elements in an interior cavity of the case. The deflectable walls allow a user to quickly and efficiently stow the numerous elements in the case and contain them for transport. The carrying case further includes a set of wheels, a retractable handle, and a fixed handle. These features facilitate transporting the system by enabling the user either to roll the case via the wheels and retractable handle or to lift the system via the fixed handles. Finally, the carrying case includes means to seal the interior cavity of the case, thereby protecting the welding elements during transport or during long periods of inactivity.

DRAWINGS

These and other features, aspects, and advantages of the present invention will become better understood when the following detailed description is read with reference to the accompanying drawings in which like characters represent like parts throughout the drawings, wherein:

FIG. 2 is a perspective view of the carrying case illustrating a retractable handle, wheels, and fixed handles;

FIG. 3 is a perspective view of a carrying case used in the system of FIG. 1 as viewed with the case opened to illustrate an interior flap and pockets located in an interior cavity of the case for storing welding components and tools;

FIG. 8 is a perspective view of the portable welding system of the previous figures, illustrating all of the welding elements removably disposed in the carrying case with the retractable handle fully extended for transport; and FIG. 9 is a perspective view similar to that of FIG. 6, further illustrating the zipper partially closed to seal the interior cavity and protect the welding elements.

DETAILED DESCRIPTION

Figure 1:
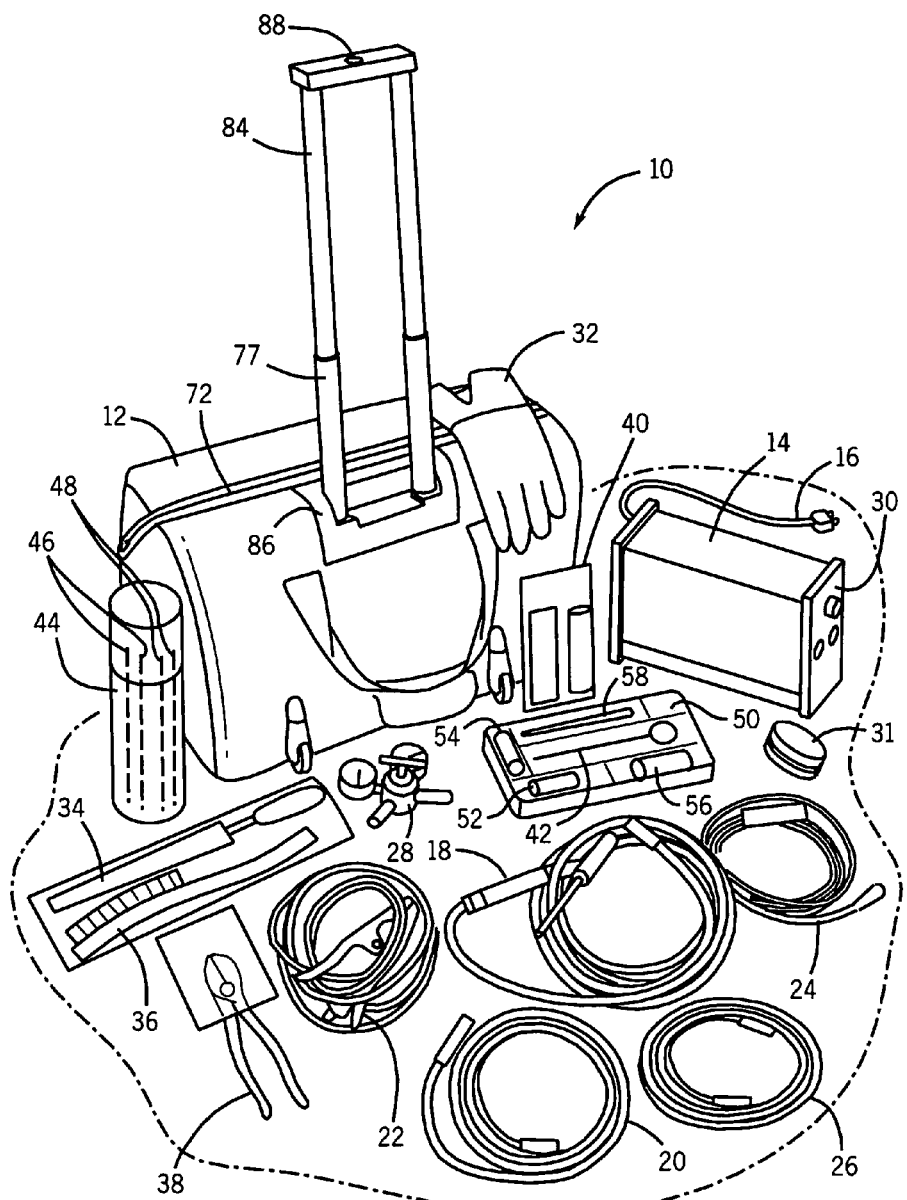
FIG. 1 is a perspective view of the portable welding system, illustrating the elements of the system in a presently contemplated embodiment of the invention.

Turning now to the drawings, FIG. 1 illustrates the elements of the portable welding system or kit in accordance with an exemplary embodiment of the invention. The portable welding system 10 includes a soft-pack carrying case 12 for storing and transporting the elements of the welding system. The soft-pack carrying case will be discussed in more detail below with reference to FIG. 2. The elements of the welding system include a power source 14 configured to perform Gas Tungsten Arc Welding (TIG) and Shielded Metal Arc Welding (SMAW) or Stick welding processes. An electrical power cord 16 extends from the power source enabling the source to be connected to either 115 volt AC or 230 volt AC single-phase primary power receptacles. The system further includes a number of welding tools. These may include a TIG torch 18, an electrode cable 20, a work piece cable 22, a remote control 24, a gas hose 26, and a flow meter or regulator 28. These elements interface a control panel 30 of the power source. The power source may further include a shoulder strap 31 for individual transport.

It should be noted that, while reference is made herein to specific types of welding equipment and even to equipment designed for specific types of welding, the invention is not intended to be so limited. Indeed, the apparatus equipped for transport in accordance with the invention may include welding and cutting systems in general, power supplies for such systems, wire feeders, portable water coolers designed to operate with welding equipment, and so forth.

The welding kit may further include work piece preparation tools, weld inspection tools, and a welding accessory box containing consumable or maintenance welding supplies. In the illustrated embodiment, the work piece preparation tools include welding gloves 32, a file 34, long handle stainless steel brush 36, and a side cutter 38. The kit may further include various other files, brushes, or other preparation tools depending upon the desired application. Weld inspection tools may include a flashlight 40, an inspection mirror 42, as well as various other inspection tools. An electrode storage case 44 is also included to house stick electrodes 46 and consumable filler wire 48 for TIG welding. Finally, a welding accessory box 50 may be provided, such as for maintenance items for the TIG torch. These items may include collets 52, collet bodies 54, nozzles 56, and back caps 58.

It should be noted, that one of the significant contributions of the present invention is its flexibility to store a number of items and elements related to a welding operation conveniently together for transport and use. Furthermore, the present invention is by no means specifically limited to the items described, but rather it allows the user the flexibility of choosing specifically which items should be transported for any given welding application. At the same time, standard kits may be pre-assembled with the key items that are of most use in common welding operations, enabling improved standardization of the equipment, such as for sales and inventory by a supplier, and purchase and even sharing by welders, welding apprentices, and welding service enterprises.

Referring to FIG. 1 and FIG. 2, carrying case 12 generally comprises a front side 60, a left side 62, a right side 64, a back side 66, a top 68, and a base 70. In the present embodiment shown, the case is made from a durable fabric-like material having deflectable walls. A zipper 72 extends generally across the top of the case from the right side to the left side. The present invention is not limited to this or any particular closure, however, and number of different configurations could be used to seal the case. For example, a button snap, a clip, a hook and loop fastener, a strap, or a combination of these closure means may be implemented in place of or in conjunction with the zipper. The carrying case 12 further includes fixed handles 74 (i.e., fixed to the case) that may be positioned on opposites of the case. The handles allow the user to lift and transport the welding system in situations where carrying it is most convenient. Additionally, a shoulder strap may be attached to the case to further facilitate transport.

The case also includes a set of wheels 76 and a retractable handle 77. The wheels and the retractable handle allow the user to transport the welding system in situations where it is more convenient to roll the system. The distance between the wheels is referred to as the wheel base 78. One particularly useful aspect of the present embodiment shown is that the wheel base is at least 40% wider than the width 80 of the carrying case 12. This wide wheel base prevents the case from tipping over during transport by distributing the load to the outer edges of the case, thereby counteracting any load shifting that may occur during transport. Retractable handle 77 includes telescope segments 84 that enable the handle to collapse down into a handle housing 86 located in the case. A button 88 is included on the handle to disengage a locking feature of the handle, allowing the user to retract the handle. When retracted, the handle reduces the profile of the welding system, thereby reducing the amount of room required for storage or transport.

Figure 4:
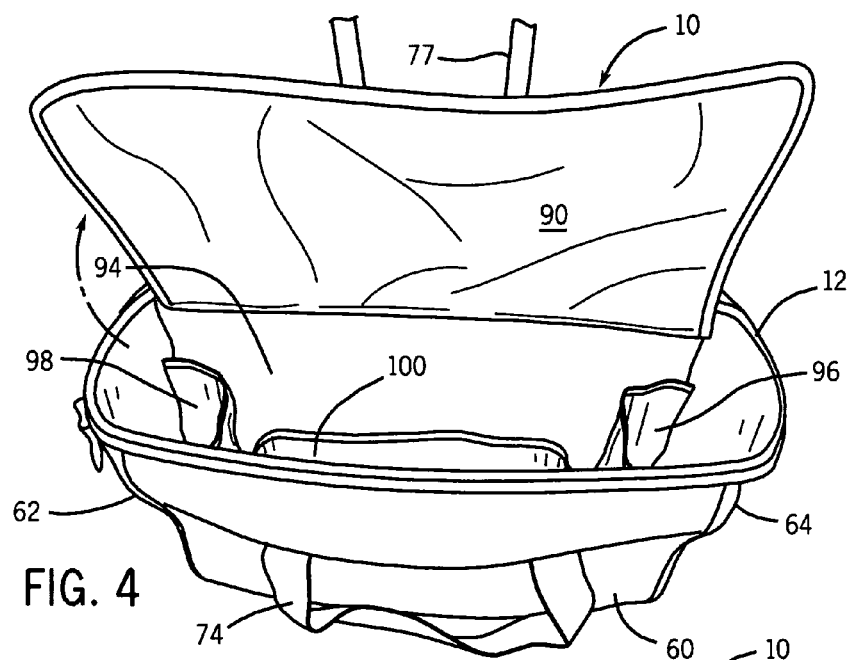
FIG. 4 is a perspective view similar to that of FIG. 3, further illustrating the interior flap lifted out of the case to fully expose the interior cavity of the case and interior pockets.

Referring generally to FIG. 3 through FIG. 7, these figures illustrate a perspective view of the carrying case with the zipper 72 and the top of the case opened. FIG. 3 illustrates an interior flap 90 that includes a flap pocket 92 that may be used to store welding elements. The flap is hingedly fixed to the interior of the case and can be positioned outside of the case to expose the interior cavity 94 of the case, as shown in FIG. 4. FIG. 4 further illustrates the interior pockets positioned on the interior walls of the case. The exemplary embodiment includes a right side pocket 96, a left side pocket 98, and a front side pocket 100. All of these pockets, including the flap pocket may be used to isolate and secure specific welding elements for transport. Also, it should be noted that the present invention is not limited to this specific pocket configuration and may be altered or customized as required without changing the functionality of the invention.

Figure 5:
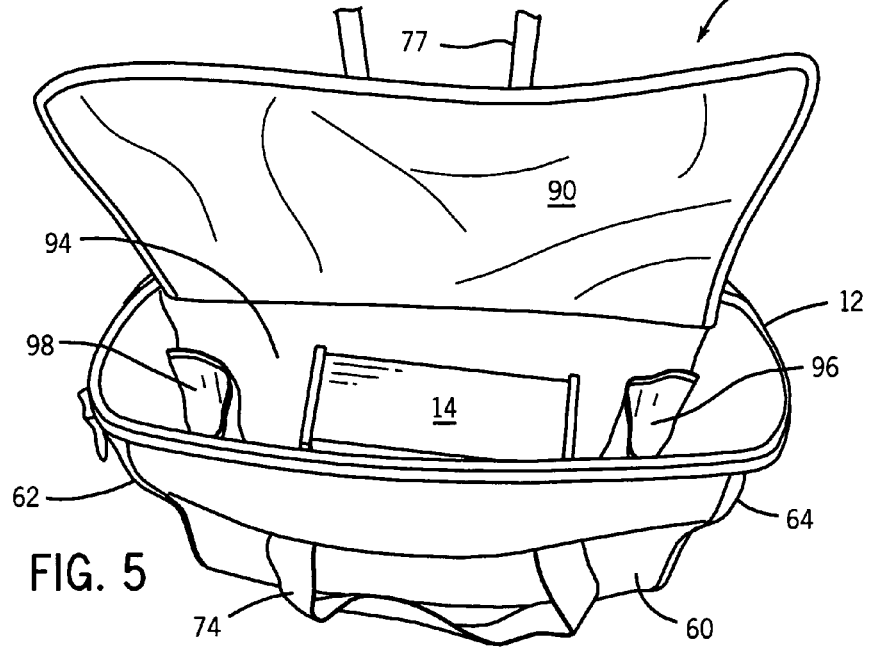
FIG. 5 is a perspective view similar to that of FIG. 4, further illustrating a power source removably disposed in the interior cavity of the case.
Figure 6:
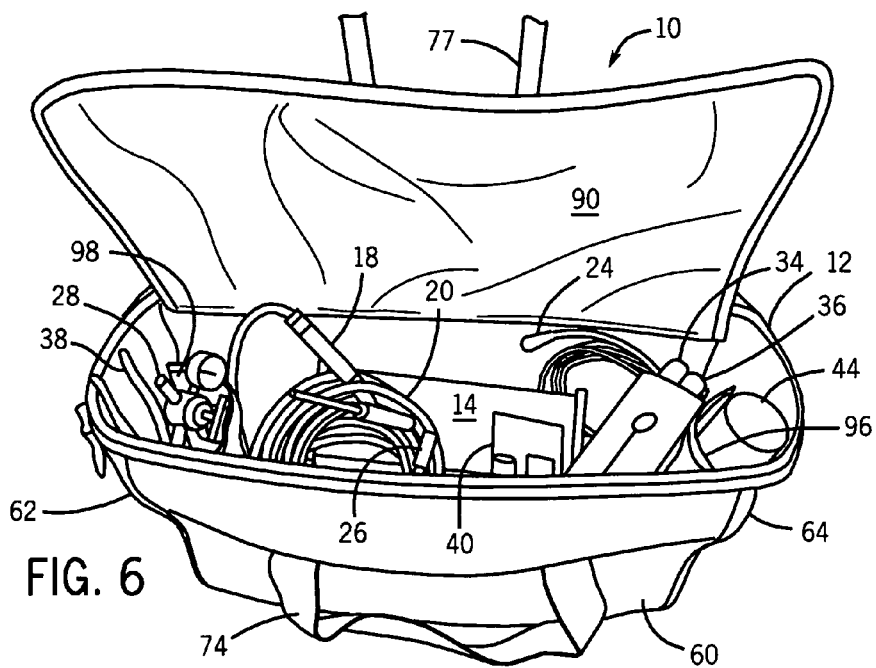
FIG. 6 is a perspective view similar to that of FIG. 5, further illustrating a number of welding elements installed in the carrying case with the interior flap lifted out of the case.
Figure 7:
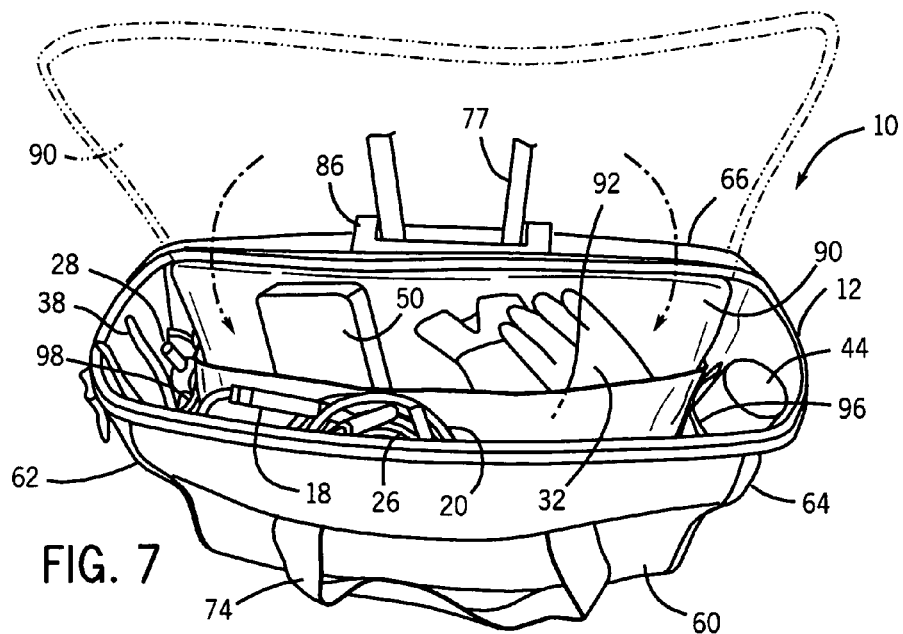
FIG. 7 is a perspective view similar to that of FIG. 6, further illustrating the interior flap installed in the interior cavity of the carrying case with welding elements installed in a pocket located on the interior flap.

FIG. 5 illustrates power source 14 removably positioned in the interior cavity 94 of the case. FIG. 6 further illustrates additional welding elements positioned inside the interior cavity of the case. FIG. 6 shows specific welding elements, for example regulator 28 or electrode/wire case 44, positioned in the interior pockets to secure these items during transport. Additionally, both figures illustrate the benefit of the hingedly fixed flap 90 and its ability to be positioned outside of the case, allowing the user complete access to the interior cavity and interior pockets of the case. Moreover, FIG. 7 illustrates the benefit of positioning the flap back inside the interior cavity once the carrying case has been loaded, providing for an additional pocket. Flap pocket 92 may be used to secure specific items that need to be quickly located or readily accessible, for example welding gloves 32 and welding accessory box 50.

FIG. 8 is a perspective view of the portable welding system, illustrating all of the presently contemplated welding elements removably disposed in the carrying case with the retractable handle fully extended and ready for transport. As discussed above, the present invention allows the user the flexibility of storing welding items in addition to the ones presently contemplated and mentioned above. For example, additional safety or inspection equipment may be included in the welding kit because of the flexibility of the carrying case. Furthermore, the present invention allows the user to position the welding elements in the desired arrangement that is most efficient for the particular application.

FIG. 9 illustrates a perspective view of the carrying case with the zipper 72 partially closed to seal off the interior cavity of the case. Sealing the interior cavity allows for containment of the welding system and provides for a means to effectively transport the welding system. Furthermore, sealing the case protects the welding system from the elements and degradation in instances where the system is used only intermittently and is stored for long durations. As discussed above, zipper 72 is contemplated in the exemplary embodiment; however the present invention is not limited to these means for sealing the interior cavity.

Finally, it should be noted that the carrying case may comprise of a plastic or a multi-layer material instead of the durable fabric-like material to provide additional protection to the welding system. Additionally, a plastic material could be used in conjunction with the fabric-like material to provide support to the walls while still allowing them to retain a deflectable characteristic.

Those skilled in the art will appreciate that the use of a soft case or pack for the welding kit offers significant advantages over conventional hard cases. For example, the case is much less cumbersome and may be more easily positioned within vehicle cabs and trunks. Moreover, the ability to stow welding articles and tools more freely within the case avoids the need to specifically form dedicated recesses or compartments in the case, and frees the welder to organize these articles and tools as will be most convenient.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A portable welding or cutting apparatus comprising: a case; a welding or cutting apparatus disposed in the case, wherein the welding or cutting apparatus includes a welding power supply configured to be removed from the case for use in a welding operation; at least two wheels disposed on a bottom of one side of the welding or cutting apparatus; and an extensible handle coupled to the welding or cutting apparatus.

2. The apparatus of claim 1, wherein the case is a soft-pack carrying case having interior compartments for receiving welding tools or supplies.

3. The apparatus of claim 1, wherein the apparatus includes a cutting device.

4. The apparatus of claim 1, wherein the apparatus includes a portable wire feeder.

5. The apparatus of claim 1, wherein the apparatus includes a portable water cooler for use in welding.

6. The apparatus of claim 1, wherein the handle is configured for telescoping extension and stowage into a side of the apparatus.

7. The apparatus of claim 1, wherein the wheels are provided on a bottom of only one side of the apparatus.

8. A portable welding kit, comprising:
a soft-pack carrying case having deflectable walls for positioning or removing elements from an interior cavity of the case, the case further including a fixed handle, a retractable handle, a set of wheels, and means for sealing the interior cavity;
a welding power source configured to be removed from the soft-pack carrying case for use in a welding operation;
at least one welding tool;
at least one work piece preparation tool;
at least one weld inspection tool;
a welding accessory box containing consumable welding supplies; and
wherein the welding power source, the welding tool, the preparation tool, the inspection tool and the accessory box are removably disposable in the interior cavity of the carrying case for transportation by lifting via the fixed handle or by rolling via the wheels and retractable handle.

9. The portable welding kit of claim 8, wherein the carrying case includes two fixed handles positioned on opposite sides of the carrying case.

10. The portable welding kit of claim 8, wherein the retractable handle includes a button configured to retract the handle into the interior cavity of the carrying case.

11. The portable welding kit of claim 8, wherein the wheels are spaced at a distance not less than about 40% of a total width of the carrying case.

12. The portable welding kit of claim 8, wherein the means for sealing the interior cavity comprises a zipper, a button snap, a clip, a hook and loop fastener, or a combination thereof.

13. The portable welding kit of claim 8, wherein the carrying case includes an interior flap having a pocket, the interior flap hingedly fixed to the interior cavity of the case.

14. The portable welding kit of claim 8, wherein the carrying case includes a plurality of pockets located in the interior cavity and positioned on the deflectable walls, the pockets configured to secure items for transport.

15. The portable welding kit of claim 8, wherein the power source is configured to perform stick electrode welding or TIG welding.

16. The portable welding kit of claim 8, wherein the at least one welding tool comprises a TIG torch, a work piece cable, a work piece clamp, a gas hose, a gas regulator and a remote control.

17. The portable welding kit of claim 8, wherein the at least one work piece preparation tool comprises a wire brush, a small stainless steel brush, a file, a side cutter, or a combination thereof.

18. The portable welding kit of claim 8, wherein the at least one weld inspection tool comprises a flashlight, an inspection minor, or both.

19. The portable welding kit of claim 8, wherein the consumable welding supplies comprises filler wire, at least one collet, at least one collet body, at least one tungsten electrode, at least one nozzle, and at least one back cap.

20. A portable welding system, comprising:
a welding kit used for a TIG welding operation, wherein the welding kit includes a welding power supply; and
a carrying case wherein the welding kit including the welding power supply is removably disposed in an interior cavity of the case and transported by lifting via a fixed handle of the case or by rolling the case via a set of wheels and a retractable handle, both the wheels and the retractable handle being integrated into the carrying case, and wherein the welding power supply is configured to be removed from the carrying case for use in a welding operation.

* * * * *